June 13, 1967     C. M. PANNAGE     3,325,094

CURRENCY VIEWER

Filed Feb. 4, 1966

INVENTOR

Charles M. Pannage

BY

*Sedfield, Kokjer, Sedfield & Lowe*

ATTORNEYS

United States Patent Office 3,325,094
Patented June 13, 1967

3,325,094
CURRENCY VIEWER
Charles M. Pannage, Roswell, N. Mex.
(4141 W. City Court, 136, El Paso, Tex. 79902)
Filed Feb. 4, 1966, Ser. No. 525,042
2 Claims. (Cl. 232—43.3)

ABSTRACT OF THE DISCLOSURE

The subject apparatus is constructed to hold and display currency involved in commercial transactions which regularly take place in stores, shops and supermarkets of all sizes and kinds. When a customer hands a cash register operator a single bill or plurality of bills of any denomination, the cash register operator will insert these bills into the apparatus where they will remain in plain sight until the transaction is completed. The subject apparatus facilitates this "escrow" currency holding by its unique construction.

A transparent cover is constructed so that the entire apparatus may be placed near existing cash register equipment and is selectively slotted in one area for the insertion of currency and in another area for the removal of same. A pivot platform, having a transparent depository pocket on one end thereof, pivotally moves between the two slotted areas, but locates the currency at an optimum viewing angle until the commercial transaction is completed.

The remaining end portion of the pivot platform forms a highly desirable space for advertising indicia. Since a customer's attention is already directed to the viewing device, as a result of having his money placed thereon, the entire apparatus becomes a projected focal point containing highly desirable advertising space.

---

This invention relates to viewing apparatus and refers more particularly to a device for viewing currency.

An object of the invention is to provide a uniquely constructed device which reduces the possibility of fraud on the part of either the customer or cash register operator during a normal change making transaction which may involve a single or a plurality of currency bills.

Another object of the invention is to provide an extremely useful, inexpensive, simple to operate currency viewer which is extremely easy to incorporate with existing cash register equipment and conventional "check-out" procedures.

Another object of the invention is to provide a currency viewer of the character described that holds currency in "escrow" and in plain sight of both cash register operator and customer during a normal change making transaction involving currency bills of any denomination.

A further object of the invention is to provide a currency viewer of the character described which may be either entirely or partially constructed of transparent plastic with a minimum of moving parts thereby resulting in a device that is extremely rugged and durable, as well as being attractive and light weight.

A still further object of the invention is to provide a currency viewer of the character described which is particularly adaptable as a means for displaying advertising copy or indicia or to be manufactured in distinctive product colors with appropriate trade marks or slogans attractively located thereon.

Other and further objects of the invention together with the features of novelty appurtenant thereto will appear in the course of the following description.

In the accompanying drawing, which forms a part of the instant specification and is to be read in conjunction therewith, an embodiment of the invention is shown and, in the various views, like numerals are employed to indicate like parts.

FIG. 1 is a perspective view of the currency viewer embodying the invention;

FIG. 2 is a top plan view of the device with a portion of the top panel and depository pocket broken away to more clearly illustrate the unique construction; and FIG. 3 is an enlarged sectional view taken generally along the line 3—3 of FIG. 2 in the direction of the arrows.

Referring now to the drawing, reference numeral 10 in FIG. 1 indicates generally the transparent cover, having a box-like appearance, which comprises the main support structure for the later to be described transparent internal elements of the viewer. The cover may be assembled and constructed of any suitable transparent material such as glass or clear acrylic plastic. I have found that transparent acrylic plastic is extremely satisfactory, being both light weight and easily adaptable to mass production and assembly. The cover itself is in the form of a parallelepiped consisting of six transparent panels, e.g. top 12, bottom 14, front 16, rear 18, and two side panels 20 and 22. These panels are interconnected and joined together by an adhesive thereby forming the completely transparent sturdily constructed, box-like structure seen in the various views. The entire device may be supported on suction cups or the like (not shown) affixed to bottom 14.

The rear portion of top 12 is slotted at 12a. In actual practice, if the device is manufactured for use in the United States, the length of the slot will be sufficiently great to allow paper money of any United States denomination to pass therethrough without difficulty. The width dimension, approximately one-half inch, is small enough to discourage removal of the currency bills that have been inserted therethrough. For a reason to be subsequently explained in greater detail, the rear panel 18 curves outwardly and is slotted along its lower portion at 18a. The length dimension of slot 18a is approximately the same as slot 12a, however the width of the slot is slightly larger to permit insertion of the hand or fingers in order to facilitate removal of the currency bill or bills in the immediate area.

The slotted top and rear panels are designed to communicate with a movable depository pocket generally shown at 24. By operation of a later to be described hand lever, the pocket is made to move in communicating relationship between slots 12a and 18a in such a manner that currency bills inserted through slot 12a are displayed for viewing purposes within the depository pocket, after which said pocket carrying the deposited bills is moved to slot 18a to facilitate removal of said bills.

Turning now to the mounting of pocket 24 interiorly of cover 10, sides 20 and 22 are apertured approximately at their midpoint allowing rod 26 to extend through the central portion of cover 10. As seen in FIG. 2, the upper end externally threaded portion of rod 26 extends through an aperture in side 20 while the lower end portion of said rod extends through a similarly sized aperture in side 22. Lateral movement of the rod is precluded by the presence of a combination lock and stop nut 28 on the upper portion of the rod and by operating handle 30, affixed by a conventional set screw 30a to the lower portion of said rod. Both apertures are selectively sized to form a type of bearing plate to thereby allow the turning or rotative movement of rod 26. Nut 28 and handle 30 make it an easy matter to remove or mount rod 26, however, the handle and an enlarged stop (not shown) could alternatively be permanently welded to rod 26 after the rod has been positioned through the apertures. For purposes of connection with the now to be described pivot platform 32, a portion of rod 26 is flattened at 26a.

Pivot platform 32 is also constructed of a transparent material such as clear acrylic plastic and has a centrally located mounting collar 32a. As seen in FIG. 3, collar 32a substantially divides platform 32 into a frontal half 32b and a rearward half 32c. At least a portion of the interior of collar 32a is flattened to facilitate the assembly of the platform 32 with rod 26. Rearward half 32c cooperates with an attached upper panel 34 to form the transparent depository pocket 24. Depending upon the actual dimensions of pivot platform 32, the depository pocket 24 may or may not have side panels. If the dimensions of cover 10 are substantially larger than the depository pocket, then it may be desirable to include side panels running from approximately the junction of upper panel 34 and the pivot plate 32 to the rear extremities of the pocket. If the dimensions of the cover and pocket are approximately the same, the side panels of the pocket may be eliminated as sides 20 and 22 sufficiently serve the purpose of locating and holding currency within pocket 24 for viewing purposes.

As seen in FIG. 3, the width of the open end of pocket 24 is slightly larger than slot 12a so as to present an unencumbered entrance for currency bills. Also the upper panel 34 tapers toward its junction with platform 32. The tapering of upper panel 34 as part of the depository pocket 24 has the effect of correctly orienting currency deposited therein so that it assumes an appropriate viewing position. The upper rearward edge extremities of both upper panel 34 and platform 32 (as seen in FIG. 3) are beveled or tapered to bear against the flat inner surface of top 12, likewise tending to locate and isolate a confined receptacle for the deposited currency bills.

The forward edge portion of pivot plate 32 has a counterweight 36 affixed along the underside of the platform by a series of screws generally shown at 36a.

The upper side of the frontal half 32b forms an area which is sufficiently large to accommodate advertising indicia, trademarks, or slogans and could be shaded to accentuate some distinctive product color.

In assembling the device, rod 26 is extended through collar 32a with the above-mentioned flat sides contacting each other. With the platform affixed to and supported by rod 24, nut 28 and handle 30 are affixed to their respective end portions. This structure allows the rod to move as supported by sides 20, 22, and to thereby carry the platform 32 with the movement of handle 30. Counterweight 36 is sufficient to cause the platform 30 to return to the solid line position shown in FIG. 3 when there is no manual force being applied to handle 30. When it is desired to move platform 32 from the solid line position shown in FIG. 3 to the broken line position, one need only press down on handle 30, thereby initiating such movement. Thusly, the platform is appropriately mounted on rod 26 to cause pocket 24 to be communicatingly positionable between and relative to either slot 12a or slot 18a. As the left or rearward end of platform 32 (FIG. 3) by construction extends laterally past the end extremities of top 12 and bottom 14, during the pivotal movement thereof, rear panel 18 is appropriately curved to accommodate the length of the platform during said movement.

In operation and use of this device, one possible embodiment of the fraud preventative currency viewer contemplates placing the device on or near a cash register in full and in plain sight of both the cash register operator and the customer. When the customer hands the cash register operator a single bill or a plurality of bills of any denomination, the cash register operator will insert the currency bills through slot 12a and into depository pocket 24. The bills will be allowed to remain in "escrow" while change is being made. Once the cash register operator has handed the customer his change and the customer has counted and accepted the change as being the correct amount, the operator will then depress handle 30 and manually remove the currency bills from the depository pocket. As mentioned above, when handle 30 is depressed, platform 32, and, of course, pocket 24, pivots to the broken line position seen in FIG. 3. When in the broken line position, the currency bill designated by the numeral 38, either slides out of the depository pocket 24 through slot 18a onto a counter top or it is a simple matter to hold handle 30 down with the right hand while inserting the fingers of the left hand interiorly of the cover 10 through slot 18a and retrieving the currency bill for final depositing into the cash register.

By use of this simple to operate and attractive multipurpose currency viewer, customers are discouraged from claiming that the currency given to the cash register operator was of a larger denomination than that for which they had received change. Additionally, the use of such a device causes the customer to be more cognizant and attentive to his change as he receives it from the cash register operator and will significantly reduce the temptation of the operator to "hold-out" on the management during a normal change making transaction.

With the increased awareness of change making procedure, the advertising copy or indicia which is displayable on frontal half 32b of platform 32, is accordingly projected to the focal point of the customer's interest thereby allowing the currency viewer to serve the dual purpose of a fraud preventative and an advertising means.

By manufacturing the cover and integral parts completely of a transparent plastic or the like, the device is inexpensive and light weight and is appropriately sized so that it may be easily positioned relative to existing cash registers and incorporated into current "check-out" procedures.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A currency viewing device comprising a transparent enclosed cover having a top, bottom, front, rear, and two sides, a first opening defined in said top, a second opening defined in said rear, a shaft rotatably supported between said two sides, a pivot platform fixedly connected to said shaft along its transverse center line, said platform extending substantially the length from front to rear of said cover, a transparent depository currency holding pocket formed integrally with the rear half of said platform, said pocket being comprised of said rear half of said platform and an upper transparent face panel which diverges to the rear from a fixed connection at an acute angle with said center line portion of said platform, said rearward end extremities of said upper plate and said platform cooperating to form an orifice for said pocket, an operating handle affixed to one end portion of said shaft, said handle operable to impart rotational movement to said rod thereby moving said orifice between a communicating relationship with said first opening to a communicating relationship with said second opening, said pocket operable to receive currency through said communicating first opening and said orifice and to support same for unrestricted visual inspection through both said pocket face panel and said cover.

2. The invention as in claim 1 wherein the upper surface of the forward half of said platform has advertising indicia thereon, said advertising indicia being optimally viewed when said platform is pivoted to align said orfice in said first opening.

References Cited

UNITED STATES PATENTS

| | | | |
|---|---|---|---|
| 149,947 | 4/1874 | Moses | 232—58 |
| 527,614 | 10/1894 | Metcalf | 232—58 |
| 734,268 | 7/1903 | Lane | 232—58 |
| 1,242,739 | 10/1917 | Tappan | 232—66 |
| 1,900,039 | 3/1933 | Brandt | 232—1.4 |
| 2,337,625 | 12/1943 | Socksteder | 232—65 |
| 2,478,076 | 8/1949 | Baker | 232—58 |
| 2,886,917 | 5/1959 | Yates | 232—43.3 |

FRANCIS K. ZUGEL, *Primary Examiner.*